United States Patent [19]
Roberts

[11] Patent Number: 4,760,116
[45] Date of Patent: Jul. 26, 1988

[54] MONOLAYER POLYETHYLENE SHRINK FILM

[75] Inventor: Richard K. Roberts, Clinton, Iowa

[73] Assignee: E. I. Du Pont de Nemours and Company, Wilmington, Del.

[21] Appl. No.: 937,035

[22] Filed: Nov. 26, 1986

[51] Int. Cl.⁴ .............................................. C08L 23/20
[52] U.S. Cl. .................................... 525/221; 522/112; 525/222; 525/227; 428/500
[58] Field of Search ................ 428/516, 500; 525/240, 525/221, 222, 227; 522/112

[56] References Cited

U.S. PATENT DOCUMENTS

| | | | |
|---|---|---|---|
| 3,299,194 | 1/1967 | Golike | 264/210 |
| 3,803,065 | 4/1974 | Arai et al. | 260/234 H |
| 3,817,821 | 6/1974 | Gallini | 161/165 |
| 3,969,304 | 7/1976 | Pugh et al. | 260/32.6 PQ |
| 4,178,401 | 12/1979 | Weinberg et al. | 428/35 |
| 4,229,241 | 10/1980 | Mueller | 156/243 |
| 4,447,480 | 5/1984 | Lustig et al. | 428/35 |
| 4,457,960 | 7/1984 | Newsome | 428/35 |
| 4,495,249 | 1/1985 | Ohya et al. | 428/516 |
| 4,532,189 | 7/1985 | Mueller | 428/516 |
| 4,547,413 | 10/1985 | Lustig et al. | 428/35 |
| 4,551,380 | 11/1985 | Schoenberg | 428/218 |

FOREIGN PATENT DOCUMENTS 57-144716  9/1982  Japan .
57-144717  9/1982  Japan .
58-167636  10/1983  Japan .

Primary Examiner—Edith Buffalow

[57] ABSTRACT

This invention relates to a heat-shrinkable film consisting essentially of a blend of 99.5–98.5 weight % of linear low or medium density polyethylene and 0.5–1.5 weight % of one or more copolymers of ethylene with a monomer selected from vinyl acetate and acrylic acids or esters, where said film has been cross-linked to the degree induced by an irradiation dosage of about 1 to 5 megarads.

16 Claims, No Drawings

MONOLAYER POLYETHYLENE SHRINK FILM

This invention relates to a heat shrinkable film comprising a blend of linear low or linear medium density ethylene copolymer and a copolymer of ethylene and a monomer selected from vinyl acetate and acrylic acids or esters.

The distinguishing characteristic of a heat shrinkable film is its ability upon exposure to some level of heat to shrink or, if restrained, to create shrink tension within the film. This ability is activated by the packager when the wrapped product is passed through a hot air or hot water shrink tunnel. This process causes the film to shrink around the product producing a tight, transparent wrapping that conforms to the contour of the product and which is aesthetically pleasing while providing the useful functions required of packaging materials such as protection of the product from loss of components, pilferage, or damage due to handling and shipment. Typical items wrapped in shrink film are toys, games, sporting goods, stationery, greeting cards, hardware and household products, office supplies and forms, foods, phonograph records, and industrial parts.

The ability of a film to shrink upon exposure to some level of heat arises from the orientation of that film during manufacture. The films are usually heated to their orientation temperature range which varies with the different polymers but is usually above room temperature and below the polymer's melting temperature. The film is then stretched in the cross or transverse direction and in the longitudinal or machine direction to orient it. After being stretched, the film is rapidly cooled to quench it, thus freezing the molecules of the film in their oriented state. Upon heating, the orientation stresses are relaxed and the film will begin to shrink back to its original, unoriented dimension.

The temperatures in the wrapping machines currently in use are very variable. Thus, it is advantageous to have a shrink film which will shrink over a broad temperature range and which will also withstand the high temperatures to which it may be exposed in some wrapping equipment. The only commercially available shrink film having the desired broad shrink temperature range as well as excellent toughness and clarity properties is a three layer film as described in U.S. Pat. No. 4,551,380. The three layer film has two surface layers comprising a blend of linear low density polyethylene, linear medium density polyethylene and 20 to 30 % ethylene vinyl acetate and a core layer of linear low density polyethylene.

SUMMARY OF THE INVENTION

It has now been found that a polyolefin heat shrinkable film with desirable properties can be made by extruding into a single layer film a blend of linear low or medium density polyethylene with a small amount of ethylene vinyl acetate or ethylene acrylic acid or ester copolymer or mixtures thereof and subjecting the film to conditions to induce cross linking. Specifically, the heat-shrinkable films of this invention consist essentially of a blend of 99.5-98.5 weight % of linear low or medium density polyethylene and 0.5-1.5 weight % of one or more copolymers of ethylene with a monomer selected from vinyl acetate and acrylic acids or esters, where said film has been cross-linked to the degree induced by an irradiation dosage of about 1 to 5 megarads. The films of this invention have excellent optical properties, good processing characteristics and good physical strength properties. Among the processing characteristics of the films are a broader shrink temperature range than found in conventional linear low or medium density polyethylene films and a low coefficient of friction when heated.

DETAILED DESCRIPTION OF THE INVENTION

The term "heat shrinkable" as used herein refers to a material which, when heated to an appropriate temperature above room temperature (e.g., about 96 degrees C.), will have a free shrink of 5% or greater in at least one linear direction.

The terms "linear low" and "linear medium density polyethylene" as used herein refer to copolymers of ethylene with one or more comonomers selected from $C_4$ to $C_{18}$ alpha olefins such as butene-1, octene, etc., in which the molecules thereof comprise long chains with few side chains branches or cross-linked structures. This molecular structure is to be contrasted with conventional low or medium density polyethylenes which are more highly branched than their respective linear counterparts. Linear low density polyethylene has a density usually in the range of from about 0.900 grams or less per cubic centimeter to about 0.925 grams per cubic centimeter. Linear medium density polyethylene has a density usually in the range of from about 0.926 grams per cubic centimeter to about 0.941 grams per cubic centimeter. The melt index of the polyethylene is generally within the range of 0.5 to 2.0. The preferred polyethylenes are those copolymers of ethylene with one or more comonomers selected from $C_8$ to $C_{18}$ alpha olefins, and the most preferred polyethylene is a copolymer of ethylene with 1-octene.

The term "ethylene vinyl acetate" as used herein refers to a copolymer formed from ethylene and vinyl acetate monomers wherein the ethylene derived units in the copolymer are present in major amounts and the vinyl acetate derived units in the copolymer are present in minor amounts. Preferably, the ethylene vinyl acetate copolymer contains 3-20% by weight vinyl acetate, and more preferably, it contains about 12 % by weight vinyl acetate.

The term "ethylene acrylic acid or ester copolymer" as used herein refers to a copolymer formed from ethylene and an acrylic acid or ester wherein the ethylene derived units in the copolymer are present in major amounts and the acrylic acid or ester derived units in the copolymer are present in minor amounts. Examples are ethylene methyl acrylate, preferably containing 10-25 % by weight methyl acrylate; ethylene ethyl acrylate, preferably containing 10-25 % by weight ethyl acrylate; and ethylene acrylic acid, preferably containing 7-20% acrylic acid.

It has surprisingly been found that the addition of very minor amounts of ethylene vinyl acetate or ethylene acrylic acid or ester copolymer to the linear low or medium polyethylene results in a blend which, when extruded and oriented into a heat shrinkable film, exhibits a broader shrink temperature range than conventional linear low or medium density polyethylene films which have not been so modified. The temperatures at which the modified films of this invention weaken or burn through in a shrink tunnel can be 20 to 25 degrees F. higher than the temperatures at which the corresponding unmodified films will do so. The amount of ethylene vinyl acetate or ethylene acrylic acid or ester copolymer which must be added to the polyethylene to achieve this result is in the range of about 0.5 to 1.5 % by weight, with 1 % having been found to be optimal. It is recognized, however, that slightly greater or lesser quanitites of the additive may still enhance the shrink temperature range of the polyethylene films. It is also recognized that the optimal amounts of the additive will vary depending upon the polyethylene used, the additive used, and other additives in the blend.

Slip and anti-block agents are traditionally added to polyethylene films for ease of handling, and it has been found that a greater amount of slip agent is required in the modified films of this invention than in corresponding unmodified films to obtain films with a commercially acceptable coefficient of friction. Slip agents traditionally used in polyethylene films include fatty amides such as erucamide, behenamide, stearamide, N,N-ethylene-bis-stearamide, N,N-ethylene-bis-oleamide, lauramide and blends thereof. These slip agents are preferably used in amounts of 2400-3000 ppm of the blend, the preferred slip agent being erucamide. A preferred anti-block agent is diatomaceous silica, $SiO_2$. This is preferably used in amounts of 1200-1500 ppm of the blend.

The modification of the linear low or medium density polyethylenes by addition of ethylene vinyl acetate or ethylene acrylic acid or ester copolymer alone is not sufficient to broaden the shrink temperature range of a film made therefrom. The film must be treated to induce crosslinking of the polymeric molecular chains contained therein. It is generally well known that irradiation of certain film materials can result in such crosslinking and that irradiation may be accomplished by the use of high energy irradiation using electrons, X-rays, gamma rays, beta rays, etc. Preferably, electrons are employed of at least about $10^4$ electron volt energy. Irradiation at a dosage of about 1–5 megarads is generally sufficient to cross-link the polyethylenes used in this invention, and irradiation at about 2.5 megarads is preferred.

The most preferred film of this invention is one prepared from a blend of linear low density polyethylene with about 1% by weight ethylene vinyl acetate (having 12% vinyl acetate), about 2700 ppm erucamide and about 1300 ppm silica which film is irradiated at a dosage of about 2.5 megarads.

The films of this invention can be prepared by extrusion and orientation methods well known in the art. The blend components can be combined by dry or melt blending, although it has been found to be preferable to melt blend the components with enough shear to lower the melt index of the resin from about 1.1 to 1.0. The preferred method for orienting the films is the well known "bubble" method. In this method, the film is extruded first as a thick-walled tubular tape, cooled below the melting point of each of the layers, irradiated, then reheated and oriented as a bubble to form the film. Finally, the film is cooled, the bubble is collapsed and wound up. Orientation of the film by this method is in both the transverse and machine directions. The transverse direction stretch is accomplished by blowing air into the tubing, and machine direction stretch is accomplished by rollers which pull the film upwards.

Films of this invention and their preparation are illustrated in the following examples. The films in these examples were prepared and tested using the methods described below.

Method for Preparing Films

Samples were prepared by first extruding a single-layer tube through a typical circular die. Sizes and speeds depended upon whether the samples were made on a semiworks line or commercial line, and the different sizes and speeds used on each line are set forth below in Table 1. The extruded tube was passed over an internal quenching mandrel which was maintained at 20 deg C. The tubing was reheated to a temperature below the melting point of the polymer. Simultaneously with heating, the tube was stretched in the transverse direction (TD) by blowing air into the tubing, and in the machine direction (MD) by pulling the film with rollers running 3.0–4.0 times faster than the tube speed. The air was introduced into the tube at a pressure which expanded the tube to five times its original diameter and produced a hoop stress in the expanded bubble of 2000–2500 psi. The bubble was collapsed, slit in the case of Method 2, and the resulting film was irradiated at 2.5 MR.

TABLE 1

|  | Method 1 Semiworks | Method 2 Commercial |
| --- | --- | --- |
| Extruder diam. | 0.051 m | 0.2 m |
| Tube diam. | 0.053 m | 0.36 m |
| Tube speed | 1.83 m/min | 17.7 m/min |
| Bubble pressure | 1866–2488 Pa | 348 Pa |
| Film Speed | 7.3 m/min | 71.3 m/min |
| Bubble diam. | 0.318 m | 1.8 m |

Resin feed for each sample was prepared by first preparing slip and antiblock concentrates. The concentrates were made by extruding linear low density polyethylene resin having a density of 0.921 g/cm$^3$, a melt index of 1.1, and about 11% octene (Dowlex 2050 or 2050A, Dow Chemical Company, Midland, Michigan) with the desired slip additive and with silica anti-block agent (White Mist, Manville International Corp., Denver, Colorado). The concentrates were dry blended with the polyethylene resin and the ethylene vinyl acetate or ethylene acrylic acid or ester by running the components through a commercial solids blender. An alternative method of blending was to blend all components on a mixing extruder. This was used in the examples as noted.

Slip testing was done by (1) measuring "cold" slip, which is room temperature coefficient of friction ("Room Temp. COF"), (2) measuring "hot" slip, which is coefficient of friction at 49 deg C. ("Hot COF"), (3) measuring the time in seconds for two pads of paper to slip against each other after both have been wrapped in the test film and run through a conventional shrink tunnel at 310 deg F. ("Recovery Time for Slip). Coefficient of friction (COF) is measured on both sides of the film. Actual COF is done by a test similar to ASTM D1894.

Shrink temperature range is measured by wrapping a plastic cylinder in the film to be tested and sealing with a hot wire weld seal. The package is then placed on the conveyer of a shrink tunnel (Shanklin Y-62, Shanklin Corporation, Ayers, Massachusetts). Conveyer speed is set at 50%. Air velocities are set at maximum. Air temperatures are varied. The temperature at which a hole burns in the film is found. The upper shrink temperature is the highest temperature at which no burns or melt-throughs occur in the film.

The test for Dynamic Zero Strength Temperature (DZST) is an alternative way to measure the upper shrink temperature for a film. DZST is a measure of the melting point of the film and, more specifically, is a measure of the temperature at which a plastic film will fail while supporting a load of 20 lb. per square inch of cross sectional area. A properly loaded film sample is placed in contact with a clean metal heating bar which is heated at a constant 50 deg C./minute. The temperature at which the weight pulls the film apart is recorded as the DZST.

Other tests used in obtaining the data presented in the examples are ASTM D2454 (Gloss), ASTM D1003 (Haze) and ASTM D1746 (Transparency).

EXAMPLE 1

The films set forth in Table 2 were made by Method 2 from LLDPE (Dowlex 2050) and ethylene vinyl acetate (EVA, 12% vinyl acetate, ELVAX 3135X, E. I. du Pont de Nemours and Company, Wilmington, Delaware). They were irradiated at 2.5 MR. These examples show the degradation of hot slip with the addition of ethylene vinyl acetate, necessitating the upward adjustment of erucamide and silica.

TABLE 2

| Example | EVA % | Silica ppm | Erucamide ppm | Blending Method |
|---|---|---|---|---|
| Control A | 0 | 510 | 1029 | melt |
| Control B | 0 | 765 | 1067 | melt |
| A | 1 | 1225 | 1564 | dry |
| B | 1 | 1380 | 2400 | dry |
| C | 1 | 1500 | 3000 | dry |
| D | 1 | 1300 | 2700 | melt |
| E | 1 | 1300 | 2700 | dry |

| Example | Room Temp. COF | Hot COF | Recovery Time for Slip, sec. |
|---|---|---|---|
| Control A | 0.17/0.14 | 1.0+/0.20 | 3–10 |
| Control B | 0.13/0.14 | 0.20/0.13 | 3–10 |
| A | 0.10/0.09 | 0.31/0.17 | 60+ |
| B | 0.13/0.17 | 1.0+/1.0+ | 6–11 |
| C | 0.07/0.09 | 0.07/0.06 | <3 |
| D | 0.07/0.09 | 0.11/0.12 | <3 |
| E | 0.10/0.10 | — | <3 |

| Example | Haze, % | Gloss, % | Transparency, % |
|---|---|---|---|
| Control A | 1.3 | 141/140 | 79 |
| Control B | 2.2 | 127/126 | 65 |
| A | 1.8 | 136/134 | 71 |
| B | 1.7 | 136/134 | 68 |
| C | — | — | — |
| D | 2.3 | 129/129 | 72 |
| E | 3.9 | 113/113 | 64 |

EXAMPLE 2

The data in Table 3 illustrate the effect of the addition of ethylene vinyl acetate on shrink temperature range. All samples were made from LLDPE (Dowlex 2050 resin) and EVA (Elvax 3135X) resin with the EVA and slip additive concentrate dry blended. All were irradiated at 2.5 megarads. Films were prepared by Method 2. Best results for average upper temperature limit were obtained in this test with 0.82 weight % EVA.

TABLE 3

| Percent EVA Copolymer in Blend | Percent VA in Copolymer | Percent VA in Blend | Other Additives | Upper Average Temp. Limit |
|---|---|---|---|---|
| 2.08 | 12++ | 0.25 | | 190 C |
| 0.82 | 12 | 0.1 | 2% Booster* | 196 C |
| 0.82 | 12 | 0.1 | | 196 C |

TABLE 3-continued

| Percent EVA Copolymer in Blend | Percent VA in Copolymer | Percent VA in Blend | Other Additives | Upper Average Temp. Limit |
|---|---|---|---|---|
| 0.00 | — | — | | 168 C |
| 0.41 | 12 | 0.05 | | 163 C |

*Booster is an ethylene-butene copolymer with peroxide cross-linking agents, manufactured and sold by Du Pont Canada, Inc.

EXAMPLE 3

The films in Table 4 were prepared using Method 2 from LLDPE (Dowlex 2050 resin), dry blended. All were irradiated at 2.5 megarads. Slip antiblock levels were 1200 ppm erucamide and 900 ppm silica. The data show an apparent optimum average upper temperature and DZST at 1% added ethylene vinyl acetate.

TABLE 4

| Percent EVA in Blend | Percent VA in Copolymer | Percent VA in Blend | Average Upper Temp. Limit | DZST |
|---|---|---|---|---|
| 2 | 12 | 0.24 | <182 C | 169 C |
| 1 | 12 | 0.12 | 182 C | 188 C |
| 0 | — | 0.00 | <182 C | 151 C |

EXAMPLE 4

The films in Table 5 were prepared using Method 1 using LLDPE (Dowlex 2050) dry blended with additives. The EVA with 12% VA was Elvax 3135X, and the EVA with 3% VA was Alathon 3445 (E. I. du Pont de Nemours and Company, Wilmington, Delaware). Slip-antiblock levels were 1200 ppm erucamide, 900 ppm silica. All were irradiated at 2.5 megarads.

TABLE 5

| Percent EVA in Blend | Percent VA in Copolymer | Percent VA in Blend | Average Upper Temp. Limit | Comments |
|---|---|---|---|---|
| 1 | 12 | 0.12 | 185 C | |
| 3 | 3 | 0.09 | <185 C | |
| 6 | 3 | 0.18 | 185 C | |
| 9 | 3 | 0.27 | 185 C | v. hazy |
| 0 | — | 0.00 | <185 C | |

EXAMPLE 5

Films in Table 6 were prepared by Method 1, using LLDPE (Dowlex 2050) and EVA (Elvax 3135X), dry blended. These samples show the effect of percent EVA and the level of irradiation on upper shrink temperature. Addition of 1% EVA appears optimum, and irradiation at 2.5 megarads (MR) appears adequate when EVA is added.

TABLE 6

| Percent EVA in Blend | Percent VA in Copolymer | Irradiation (MR) | Average* DZST | Average Upper Temp. Limit** |
|---|---|---|---|---|
| 0 | — | 2.5 | 161 C | 171 C |
| 0 | — | 2.75 | 167 C | — |
| 0 | — | 3.0 | 174 C | — |
| 0 | — | 3.2 | 170 C | 179 C |
| 1 | 12 | 2.5 | 175 C | 182 C |
| 1 | 12 | 2.75 | 207 C | — |
| 1 | 12 | 3.0 | 209 C | — |
| 1 | 12 | 3.2 | 225 C | 182 C |

TABLE 6-continued

| Percent EVA in Blend | Percent VA in Copolymer | Irradiation (MR) | Average* DZST | Average Upper Temp. Limit** |
|---|---|---|---|---|
| 2 | 12 | 2.5 | 154 C | 179 C |
| 2 | 12 | 2.75 | 204 C | — |
| 2 | 12 | 3.0 | 182 C | — |
| 2 | 12 | 3.2 | 211 C | 174 C |

*Average of ten determinations
**Average of five determinations

EXAMPLE 6

The data for the films in Table 7 illustrate the effect of additives other than ethylene vinyl acetate. Method 1 was used to prepare these films, with dry blending of the ingredients. The base resin was Dowlex 2050. All were irradiated at 2.5 megarads.

TABLE 7

| % and Type Copolymer in Blend | Percent Non-Ethylene Monomer in Copolymer | Percent Non-Ethylene Monomer in Blend | Average Upper Temp. Limit |
|---|---|---|---|
| 1% ethylene ethyl acrylate | 15* | 0.15 | 199 C |
| 1% ethylene methyl acrylate | 20** | 0.20 | 188 C |
| 3% ethylene methyl acrylate | 20 | 0.60 | 188 C |
| 1% ethylene methyl acrylate | 24*** | 0.24 | 199 C |
| 3% ethylene methyl acrylate | 24 | 0.72 | 199 C |
| 1% ethylene vinyl acetate | 12 | 0.12 | 202 C |

*Union Carbide DPDA 6182
**Chevron Chemical "Polyeth" 2205
***Chevron Chemical "Polyeth" 2260

EXAMPLE 7

The data in Table 8 illustrate the effect of irradiation. In the table, LLDPE stands for Dowlex 2050 resin, EVA stands for Elvax 3135X.

TABLE 8

| Blend | Irradiation (Megarads) | Avg. Upper Temp. Limit |
|---|---|---|
| LLDPE 1000 ppm erucamide 400 ppm silica | 0 | 160 C |
| Same as above | 2.5 | 171–174 C |
| LLDPE + 1% EVA 2400 ppm erucamide 1200 ppm silica | 0 | 160 C |
| Same as above | 2.5 | 182–185 C |

EXAMPLE 8

The films in Table 9 were made from blends of LLDPE (Dowlex 2050A) with ethylene acrylic acid. The percent acrylic acid in the ethylene acrylic acid in unknown.

TABLE 9

| Percent Copolymer | Average Upper Temperature Limit | Comments |
|---|---|---|
| 1.2 | 182 C | hazy |
| 1.0 | 182 C | hazy |
| 2.0 | 182 C | v. hazy |

EXAMPLE 9

The films in Table 10 were made using Method 2 and illustrate the differences between melt and dry blended material. Example A was melt blended, and Example B was dry blended. Both samples are 1% ethylene vinyl acetate (Elvax 3135X) in LLDPE (Dowlex 2050A), 2700 ppm erucamide and 1300 ppm silica.

TABLE 10

| | Haze % | Gloss, % | Transp % | Room Temp COF | Hot COF | Avg. Upper Temp. Limit |
|---|---|---|---|---|---|---|
| A | 1.3 | 135/134 | 75 | 0.07/0.09 | 0.11/0.12 | 182 C |
| B | 2.5 | 124/128 | 62 | 0.06/0.08 | 0.07/0.08 | 177 C |

What is claimed is:

1. A heat-shrinkable film consisting essentially of a blend of 99.5–98.5 weight % of linear low or medium density polyethylene and 0.5–1.5 weight % of one or more copolymers of ethylene with a monomer selected from vinyl acetate and acrylic acids or esters, where said film has been cross-linked to the degree induced by an irradiation dosage of about 1 to 5 megarads.

2. A film according to claim 1 where said linear low or medium density polyethylene is a copolymer of ethylene with a $C_8$–$C_{18}$ alpha-olefin.

3. A film according to claim 2 where said linear low or medium density polyethylene is a copolymer of ethylene with 1-octene.

4. A film according to claim 1 where said ethylene copolymer is ethylene vinyl acetate having a vinyl acetate content of about 3 to 20% by weight.

5. A film according to claim 4 where the amount of ethylene vinyl acetate in the blend is about 1% by weight.

6. A film according to claim 1 where said ethylene copolymer is selected from ethylene methyl acrylate, ethylene ethyl acrylate and ethylene acrylic acid.

7. A film according to claim 6 where the amount of ethylene acrylic acid or ester in the blend is about 1% by weight.

8. A film according to claim 1 which contains about 2400 to 3000 ppm of a fatty amide slip agent.

9. A film according to claim 8 where said slip agent is erucamide.

10. A film according to claim 1 which contains about 1200 to 1500 ppm silica anti-blocking agent.

11. A film according to claim 1 where said linear low or medium density polyethylene is a copolymer of ethylene with 1-octene, where said copolymer of ethylene is ethylene vinyl acetate, and where the amount of ethylene vinyl acetate in the blend is about 12% by weight.

12. A film according to claim 11 where the amount of vinyl acetate in the ethylene vinyl acetate is about 12%.

13. A film according to claim 11 which contains about 2400 to 3000 ppm of a fatty amide slip agent and about 1200 to 1500 ppm silica.

14. A method for preparing a heat-shrinkable film comprising preparing a blend of 99.5–98.5 weight % of a linear low or medium density polyethylene with 0.5–1.5 weight % of one or more copolymers of ethylene with a monomer selected from vinyl acetate and acrylic acids or esters, extruding said blend into a film and irradiating said film at a dosage of about 1 to 5 megarads.

15. The method of claim 14 where said blend is prepared by melt blending the polyethylene and ethylene copolymer.

16. The method of claim 14 where said film is irradiated at a dosage of about 2.0 to 3.2 megarads.

* * * * *

UNITED STATES PATENT AND TRADEMARK OFFICE
CERTIFICATE OF CORRECTION

PATENT NO. : 4,760,116
DATED : JULY 26, 1988
INVENTOR(S) : RICHARD K. ROBERTS

It is certified that error appears in the above-identified patent and that said Letters Patent is hereby corrected as shown below:

Column 8, Claim 11, line 50, "12%" should be -- 1% --.

Signed and Sealed this

Twenty-ninth Day of November, 1988

Attest:

DONALD J. QUIGG

*Attesting Officer*     *Commissioner of Patents and Trademarks*